ELECTRONICALLY SCANNABLE PHASE ARRAY RECEIVER

Filed Oct. 31, 1966 4 Sheets-Sheet 1

FIG. I

INVENTOR.
JORGEN AASTED
PETER H. KAFITZ
BY Carl R. Brown
Attorney

ELECTRONICALLY SCANNABLE PHASE ARRAY RECEIVER

Filed Oct. 31, 1966 4 Sheets-Sheet 2

INVENTOR.
JORGEN AASTED
PETER H. KAFITZ
BY
Carl R. Brown
Attorney

INVENTOR.
JORGEN AASTED
PETER H. KAFITZ
BY Carl R. Brown
Attorney

ELECTRONICALLY SCANNABLE PHASE ARRAY RECEIVER

INVENTOR.
JORGEN AASTED
PETER H. KAFITZ
BY
Carl R. Brown
attorney 3,518,671
ELECTRONICALLY SCANNABLE PHASE ARRAY RECEIVER

Jorgen Aasted, San Diego, and Peter H. Kafitz, La Jolla, Calif., assignors to Ryan Aeronautical Co., San Diego, Calif.

Filed Oct. 31, 1966, Ser. No. 590,563
Int. Cl. H04b 7/04; H01q 3/26
U.S. Cl. 343—100 6 Claims

ABSTRACT OF THE DISCLOSURE

An electronically scannable phase array receiver in which a single master oscillator supplies a frequency output to a plurality of antennas, with each antenna having a single step recovery diode frequency multiplier that in response to a DC bias and the master oscillator signal, supplies a given phase shifted signal to a mixer at the antenna that is multiplied in frequency.

BACKGROUND OF THE INVENTION

It is advantageous to be able to control the direction of reception of electromagnetic waves or energy received by antenna systems. This permits the receiver to scan a received beam as required and to direct the reception of the receiver and/or antenna array to a particular direction. The latter allows the receiver to substantially eliminate or reduce the magnitude of an unwanted signal from another direction.

The means now used to control the direction of reception of the beam comprise phase shifters that are external to the mixer stage. These include delaying the RF signal in the line between the antenna and the mixer by physically varying the length of the wave guide structure. This requires a very complicated mechanism that is slow in operation, that is heavy and that requires considerable power to operate. Thus the known phase shifters are inherently lossy, in that they are slow, use up a large amount of power and usually attenuate the incoming signal.

SUMMARY OF THE INVENTION

It is therefore an object of this invention to provide a new and improved scannable receiver antenna array.

It is another object of this invention to provide a new and improved scannable receiver antenna array that provides very rapid scanning of the received beam and may be used as a steerable receiver in air and space craft.

It is another object of this invention to provide a new and improved scannable receiver antenna array that is relatively light in weight, has a relatively low power requirement, is simple in mechanical construction, very quick in operation and that does not attenuate the incoming signal.

It is another object of this invention to provide a new and improved scannable receiver antenna array that provides higher efficiencies.

It is another object of this invention to provide a new and improved scannable receiving antenna array that is electronically operated and controlled.

This invention generally comprises a scannable receiver antenna array in which the direction of reception of the antenna array is controlled electronically by the controlled varying or selecting of the phase of the local oscillator output at each antenna. This is specifically accomplished by employing a step recovery diode multiplier to generate and phase control the local oscillator signal to the mixer. This phase control is accomplished by controlling the polarity and magnitude of direct current bias to each of the local oscillator multipliers.

The particular step recovery diode multiplier used in the specific embodiment in this specification provides electromagnetic energy output to wave guides, however it should be recognized that step recovery diode multipliers using electrical circuit with lumped components or strip line carried outputs can also be used where lower frequencies are used, so long as the circuit uses bias control to selectively vary the phase of the output of the multiplier relative to the phase of the output of the other local oscillator 5.

A step recovery diode is particularly useful in a frequency multiplier because of the diode's capability of multiplying the input frequency. The process by which a step recovery diode converts power from one frequency to a harmonic of that frequency is well documented in the literature. Reference is made to Stewart M. Krakauer, "Harmonic Generation, Rectification, and Lifetime Evaluation With The Step Recovery Diode," Proceedings I.R.E., vol. 50 No. 7, pp. 1665–1676, July 1962. The step recovery diode is a diode with special function characteristics and which may also be called a snap diode, snap varactor or a punch through varactor.

Basically, the step recovery diode is believed to operate as follows. During forward conduction, a semi-conductor diode stores charges in the form of minority carriers in the region of the junction. When the polarity of the voltage applied to the diode is reversed, this stored charge must be swept out before the diode ceases to conduct. Thus the diode is for a short initial period able to conduct with relatively low impedance in the reverse direction. Then a very abrupt transition from a reverse storage condition to cutoff occurs. This causes a very rapid drop in the current magnitude flowing through the diode.

Accordingly, if the voltage applied to the diode is suddenly reversed, the diode continues to conduct until the charge is depleted. Then the diode suddenly goes from a low to high impedance. The step recovery diode thus functions as a very high speed switch and is simply a diode whose parameters have been optimized to make the transition from stored charge condition to zero current take place very rapidly.

When a step recovery diode is used as a frequency multiplier, the step recovery diode is driven alternately into forward and reverse conduction states by the driving voltage. The transition from reverse storage condition to cut off, which occurs each negative half cycle, creates electromagnetic energy output that is rich in higher order harmonics of the driving frequency. These output bursts of the diode can be used to ring a very high Q tank circuit that selects the desired harmonic and supplies the output power between the bursts.

A biasing circuit is provided for selectively adding positive or negative direct current bias to the input alternating signal and thus selectively positioning the point of current cutoff along the negative half cycle of the input signal. This allows through bias control, in a manner that will be more clearly explained later, for the positioning of the point of current cutoff around peak negative current. In addition by varying the positions of current cutoff, the phase of the output signal is selectively varied relative to the input signal. This phase change is multiplied in the frequency multiplication of the step recovery diode and thus the phase change obtained between the phase of the input signal and the output signal can be quite large. Further this large phase change can be obtained with relatively little reduction in the magnitude of the output energy.

The phased antenna array comprises a matrix of modules with each having a step recovery diode multiplier that provides a local oscillator output. The input is supplied from a master oscillator which assures frequency coherence for all the local oscillators. Thus the bias control to the individual multipliers changes the phase of each local oscillator's output individually. The bias control for all the multipliers can be jointly controlled in any of several ways known in the art.

It will be apparent to those skilled in the art that our invention has many other advantages, applications and novel features which will become more apparent in reading the following detailed description and viewing the drawings in which.

Figure 1:
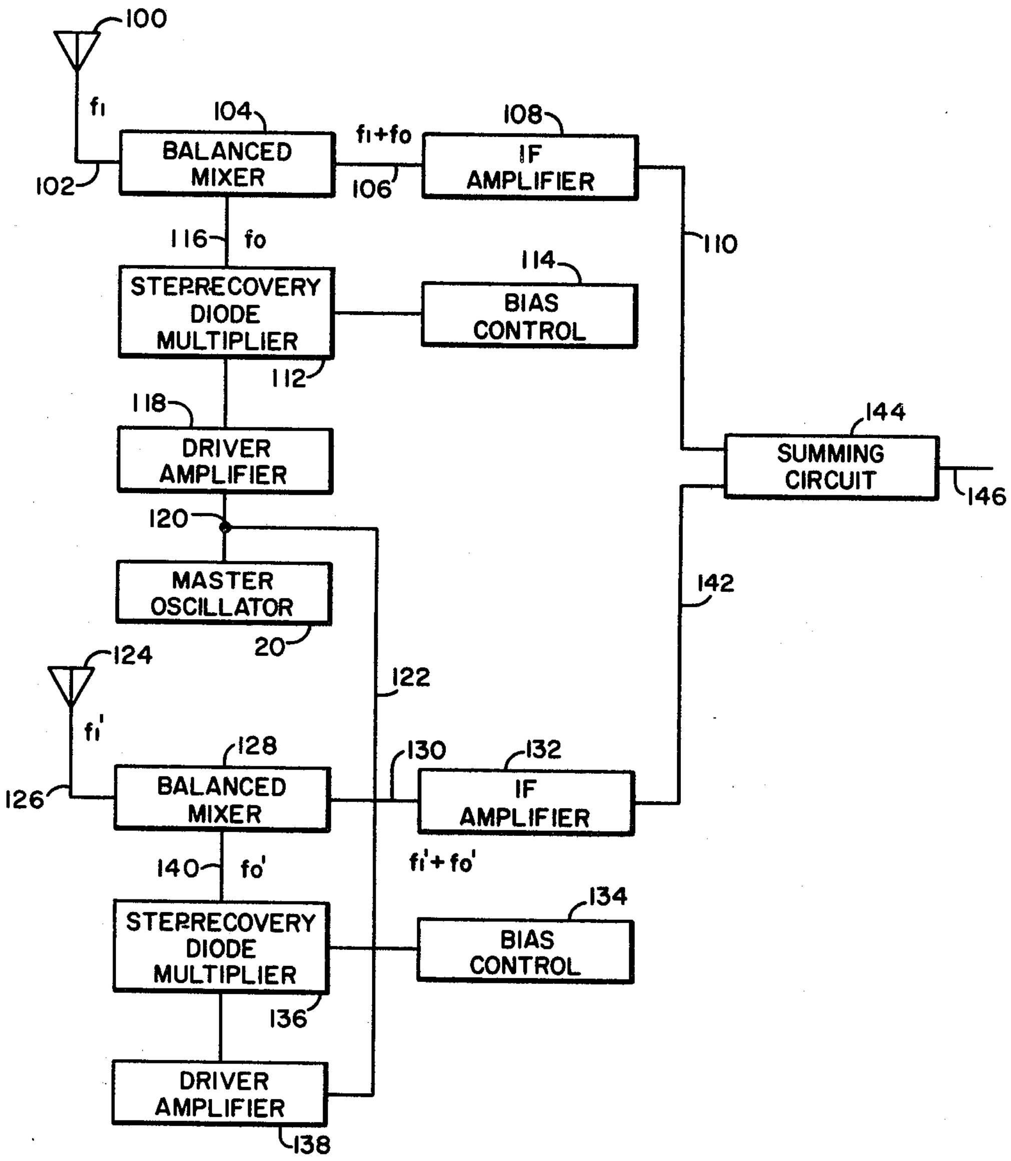
FIG. 1 is a block diagram of an embodiment of the invention.
Figure 7:
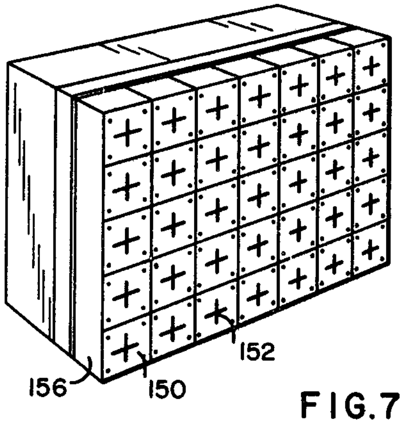
FIG. 7 is a perspective view of the receiver antenna array of this invention.
Figure 3:
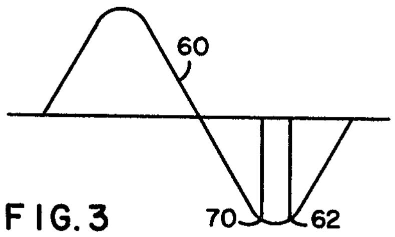
FIG. 3 is a diagrammatic representation of the input signal to the step recovery diode multiplier from the oscillator.
Figure 8:
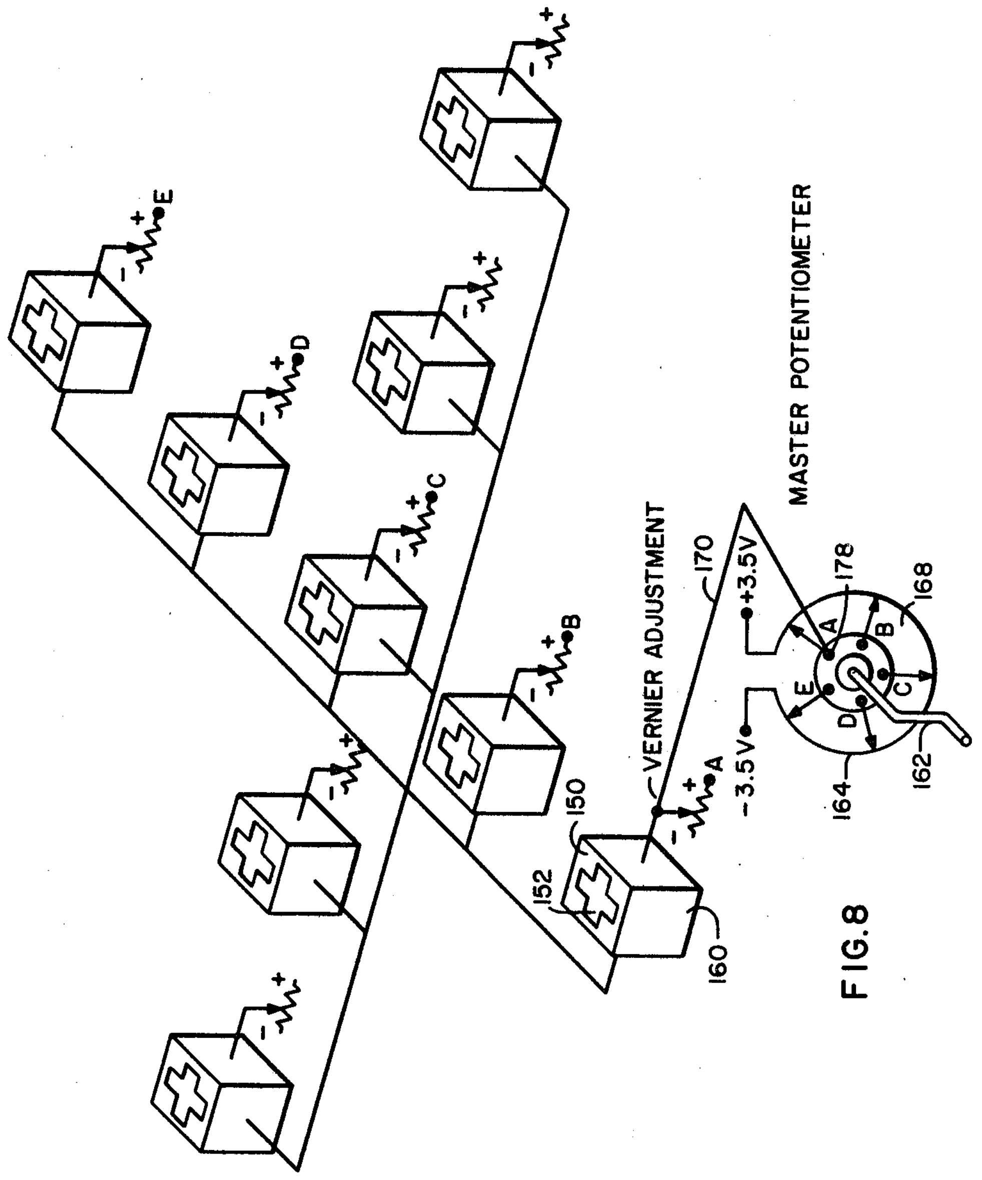
FIG. 8 is a perspective view of the individual antenna modules in spaced relationship.

Referring now to FIG. 1 in the drawings, the block diagram illustrates an embodiment with the overall logic of this invention. Antennas 100 and 124 are representative of a plurality of antennas that may be arranged in any type of desired array. Usually the array is arranged as shown in FIGS. 7 and 8 with the individual modules 150 being spaced or grouped against each other as desired. A master oscillator 20 provides an oscillating signal output for all of the individual antennas. Each antenna has the remainder of the components as illustrated in FIG. 1, with the exception of the summing circuit 144.

The master oscillator 20 provides a continuous signal of the frequency desired to a driver amplifier for each antenna. The driver amplifier amplifies the signal and feeds it to the step recovery diode multiplier 112 and 136. The multipliers 112 and 136 increase the frequency of the signal received from the master oscillator 20 and thus functions as a local oscillator for each individual antenna. The bias controls 114 and 134 function to control the phase $f_0$ and $f_0'$ of the frequency output $f_0$ from the multipliers as will be described in detail.

Figure 2:
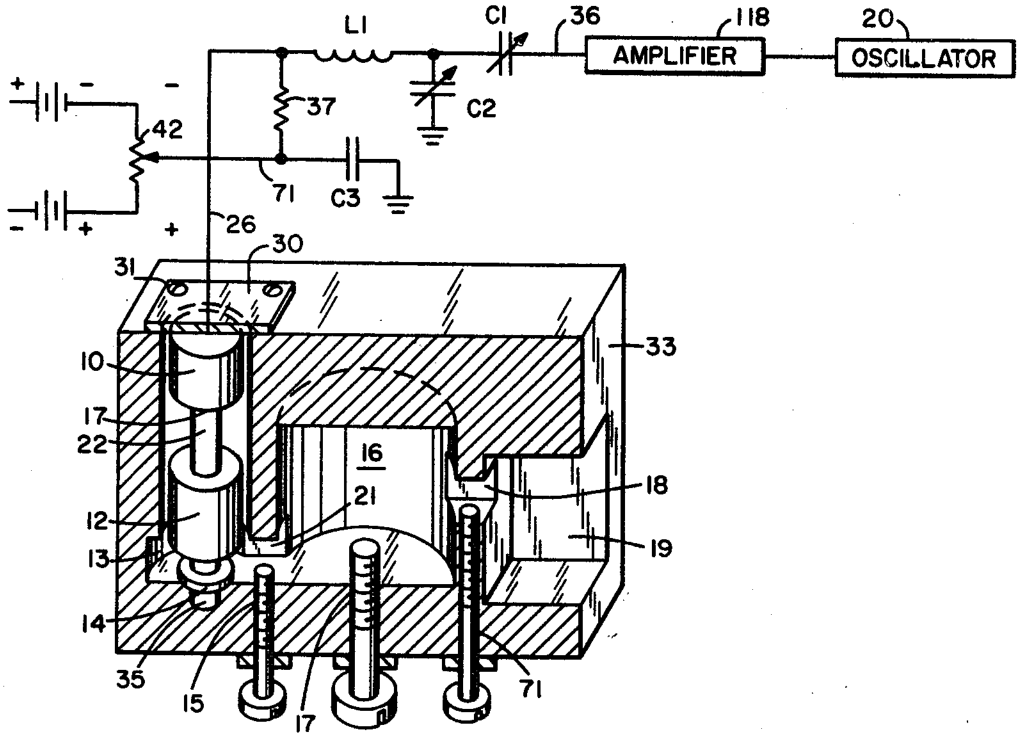
FIG. 2 is a view partly in cross section and perspective and partly in schematic of the step recovery diode multiplier that shows portions of the electrical circuit with wave guide structure.

Referring to FIG. 2, an input signal from the master oscillator 20 feeds an alternating input signal having a frequency of, for example, from 100 to 800 megacycles and a power of from 1 milliwatt to 10 milliwatts to the driver amplifier 118. It should be recognized that the input signal is not limited to the above stated frequencies or power requirements. Rather the frequency and power ranges are given merely to be illustrative. The input signal is centered around ground with positive and negative peak voltages. The driver amplifier amplifies the signal and feeds it to line 36. Variable condensers $C_1$ and $C_2$ and choke $L_1$ in line 36 comprise an LC tank circuit that is tuned and matched to the incoming signal. The total resistances of the impedance matching structure 10, 12, and 22 and the resistance of the step recovery diode 14 constitute a resistance in the tuned tank circuit of condensers $C_1$ and $C_2$ and choke $L_1$ as illustrated in FIG. 5.

Figure 5:
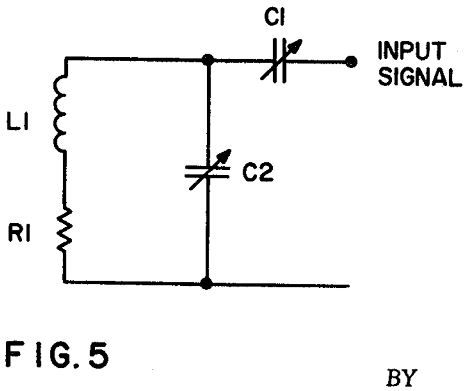
FIG. 5 is a schematic diagram of the equivalent circuit of the multiplier.

The high Q input matching tank circuit, as seen by the input signal, is essentially as shown in FIG. 5. Condensers $C_1$ and $C_2$ and inductance $L_1$ constitute the tank circuit that is tuned and matched to the incoming signal. The resistance $R_1$ is the combined resistances of the step recovery diode and the bias resistance. The tank circuit provides good energy storage of the incoming signal and the circuit is easily adjusted and can be made non-microphonic by foaming or potting the components.

A biasing circuit is connected to the input circuit line 36 through isolating resistor 37 and bypass condenser $C_3$. The source of bias comprises positive and negative potential sources connected across a relatively low resistance potentiometer 42. By adjusting the output of potentiometer 42, it is possible to provide bias to line 71 having selective potential magnitude between zero and positive and negative potentials. The bias resistor 37 constitutes a small loss of power since it is shunted by the low impedance of diode 14.

The input line 26 to the step recovery diode 14 includes two metal cylinders 10 and 12 and an intermediate conductor 22, all of which form a diode holder. The cylinders may be made of brass or from other similar and suitable materials and are wrapped with a thin layer of Teflon tape. The cylinders are a quarter wave length in length at the output frequency and are separated by a small diameter section 22 that is also a quarter wave length long.

To the output frequency the diode holder appears as alternate quarter wave length sections of a high and low impedance coaxial transmission line or effectively as a choke. To the step recovery diode 14, the impedance of the diode holder structure is essentially zero and thus little RF energy at the output frequency escapes from the input line.

The wave guide structure 33 may be made of a conducting metal such as aluminum or the like or the structure can, if desired, be made of a plastic or other suitable material having a conducting metal coating. The holding structure functions to hold the step recovery diode sufficiently rigid to prevent mechanical vibration by the diode 14. A plate 30 that is rigidly fastened to the wave guide structure 33 by screws 31, presses down against cylinder 10 and thus forces the structure and the step recovery diode 14 into a compressed physical structure that rigidly holds the diode 14 into a recess 35 and from physical movement.

Figure 4:
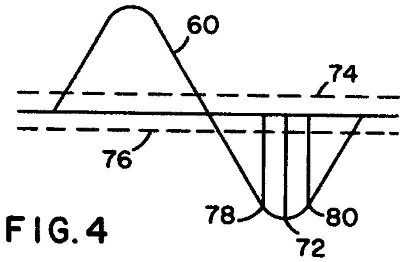
FIG. 4 is a diagrammatic representation of the input signal to the step recovery diode multiplier with bias control.

When the signal is fed through line 26, the signal passes through cylinders 10 and 12 and conductor 22 to the step recovery diode 14. The signal flowing to the step recovery diode 14 has the alternating positive and negative waveform 60 as shown in FIG. 4. The diode 14 during the positive half cycle conducts in the forward conducting condition. During the negative half cycle or the reverse conducting condition, the diode opposes reverse current flow, but this condition does not occur instantaneously. Rather there is a delay and this delay permits the step recovery diode to function as a high speed switch. When voltage is applied to the step recovery diode in the forward direction, then a charge, in the form of minority carriers, is stored in the region of the junction. In this condition, the diode 14 has a low impedance in the reverse conducting condition. When the voltage applied to the diode is suddenly reversed, then the diode 14 continues to conduct while the stored charge of minority carriers is swept out. When the charge is depleted, the diode suddenly goes from low to high impedance. The step recovery diode thus makes the transition from stored charge conduction to zero current very rapidly. It has been found that this occurs in approximately 100 picoseconds. This sudden interruption of reverse current flow is called the snap action of the step recovery diode.

The particular point of snap of the diode depends on the total minority carriers stored by a particular step recovery diode and because of variations in step recovery diodes 14, this point usually occurs at a point on the waveform other than at peak negative voltage. Thus the biasing current from the previously described biasing circuit is used to move the snap point to the point of peak negative voltage. As illustrated in FIG. 4 the biasing currents 74 and 76 can be positive or negative and have selective magnitudes. The positive biasing current 74 causes the waveform 60 to cross over from positive to negative potential at an earlier point in time. Thus if the normal point of snap of a given diode 14 is at point 80 on waveform 60, then the positive biasing current 74 will move the snap point back to point 72; the desired point of peak negative voltage. Should the snap point of diode 14 normally occur early at point 78, then a negative bias 76 will advance the snap point to point 72. Thus it may be seen that by biasing the input circuit it is possible to selectively adjust the snap point of the step recovery diode 14 to any desired point on the waveform and to selectively vary the time occurrence of the snap action.

The rapid change of current magnitude in the step recovery diode creates electromagnetic wave energy in the wave guide cavity 13 in which it is mounted. Cavity 13 forms a small resonant cavity 13. While no means for tuning this cavity is provided, the Q of the cavity comparatively low and therefore it is broad band. The diode cavity 13 is coupled to the high Q main cavity 16 through an iris 21. The coupling through iris 21 is adjustable by means of an adjustable capacitive post 15 in the center of the iris. The main resonator or cavity 16 is tunable over a narrow range by a center post 17. Output is taken from the main cavity by a second iris 18 coupled to a wave guide 19. The output coupling is adjustable by an iris screw 20 placed in its center.

Figure 6:
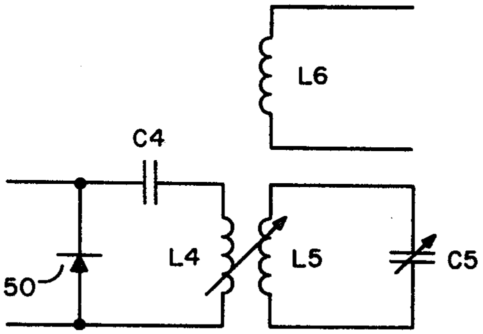
FIG. 6 is a schematic diagram of an equivalent circuit of the wave guide embodiment of the multiplier.

The cavity structures 13, 16 and 19 form a variable frequency output control means that is represented by the equivalent circuit shown in FIG. 6. The cavity 13 is represented in the equivalent circuit as the resonate circuit having capacitor $C_4$ and inductance $L_4$. The resonate circuit of cavity 13 is coupled with the resonate circuit of the cavity 16 that is represented in the equivalent circuit (FIG. 6) by the inductance $L_5$ and capacitance $C_5$. The coupling between these two resonate circuits of cavities 13 and 16 may be varied by post 15. The output wave guide cavity 19 is represented by the inductance $L_6$ and the coupling between cavity 16 and the output wave guide cavity 19 is varied by post 71. Cavity 16 is the resonator or filter for selecting the desired harmonic or frequency output. Adjustament of post 17 tunes the filter to the desired frequency output. Posts 15 and 71 are adjustable to optimize the high Q tank necessary for the step recovery diode output and thus functions to adjust the couplings. The tank circuit acts as the energy storage for the cyclic electromagnetic energy output of the step recovery diode and also acts as a filter or resonator to select the desired harmonic and thus the particular output frequency.

By adjusting the bias through line 71 to the input tank circuit, it is possible to selectively change the time or phase of the output frequency from the cavity 19 of the wave guide relative to the phase of the signal supplied from the master oscillator. While the desired magnitude of the output signal from wave guide 19 limits the degree to which the bias can be effectively used to move the point of snap by the step recovery diode, the bias can, within acceptable limits, be used to selectively position the snap point over a range of approximately 45 degrees or 22½ degrees on either side of the peak of the input negative half cycle. This change in time and phase resulting from a change in the time or point of snap of the step recovery diode relative to the timing or phase of the input signal; is multiplied in the output frequency. Thus a wide controlled phase change in the output signal is accomplished by varying the bias and thus the snap point of the diode relative to the input signal.

In operation of the multiplier, a sine wave is supplied by oscillator 20 to the resonate circuit formed by variable capacitors $C_1$ and $C_2$ and choke $L_1$. The input sine wave is fed through line 26, through a diode holding structure including cylinders 10 and 12 to the step recovery diode 14. As the sine wave passes through its negative half cycle the step recovery diode 14 snaps at some point cutting off the DC current in the negative cycle. Electromagnetic energy is generated by this snap action of the diode 14 which is supplied from cavity 13 through iris 11 to cavity 16 and through iris 18 to the output wave guide 19 for use. The bias to the input signal is adjusted to either a desired maximum interruption of the current of the input signal or is selectively adjusted by any known means of varying the bias to provide phase change in the output frequency signal from wave guide 19. The post 17 in cavity 16 is selectively adjusted to obtain a high Q resonate filter circuit and a particularly desired output frequency.

The output frequency signal from the multiplier is fed to the balanced mixer 104 where signal is mixed with the incoming signal $f_1$ that is received by the antenna 100. The circuit in FIG. 1 is shown for an installation in which the output of the multiplier can be of a lower frequency and be carried by a conductor 116 or the output of the multiplier can be of a higher frequency and in the form of electromagnetic energy as illustrated and described in FIG. 2 and be carried by a wave guide. Where the output of the multiplier 112 is electromagnetic energy, then the output of the multiplier would normally feed into a local oscillator cavity and then be fed to the mixer 104 through a wave guide. Also there may be an input resonator between the receiving antenna 100 and the balanced mixer 104 in line 102.

The balanced mixer output signal $f_1 \pm f_0$ is amplified by IF amplifier 108 and through line 110 is supplied to the summing circuit 144. The signal $f_1'$ received by antenna 124 is inturn fed through line 126 to the balanced mixer 128 where it is mixed with the output $f_0$ of the step recovery diode multiplier 136 that receives the input same signal through line 122 from the master oscillator 20. The output $f_1'$ and $f_0'$ is fed through line 130 to the IF amplifier 132 where it is amplified and fed through line 142 to the summing circuit 144. The summing circuit 144 either adds in phase or subtracts in phase the signals $f_1$ and $f_0$ and $f_1'$ and $f_0'$ to provide the desired intelligence output to line 146.

The receiver antennas will preferably take the form of modules that can be joined together into a unitary array as shown in FIG. 7. Each module 150 is a separate antenna receiver and the received signal passes through aperture 152. The bias control of the step recovery diode multiplier in each of the modules is illustrated in FIG. 8. The bias variation for causing directional receiving may be accomplished by any known means, such as for example by known mechanically controlled potentiometers or by known digitally controlled function generators. Thus the means illustrated in FIG. 8 is a representative way of controlling the bias of a line of receiver antennas. A master potentiometer 168 is connected between a positive and negative voltage of for example 3.5 volts. Wiper brushes A through E wipe against potentiometer resistance 162 and connect the potential through the master potentiometer 168 to individual modules through conductors, such as conductor 170. Thus as the crank 162 is turned a given amount, the voltage from wiper A, for example, that passes through point 178 to module 160 is varied by a controlled amount. The turning of crank 162 in FIG. 8 varies the potential to all of the inline modules A through E and other master potentiometers would similarly control the bias to, for example inline modules 174 and 176. By so adjusting the position of the wipers in the master potentiometer 168, it is readily evident that anyone having ordinary skill in the art can provide any joint bias control to the modules forming the receiver antenna array as necessary to direct the reception to any angle with the plane of the receiver antenna array or to rapidly sweep the direction of reception of the receiver antenna array.

In one form of operation, the received signals $f_1$ and $f_1'$ would have the same frequency but would have different phases because the signal would be received at an angle to the receiver antenna array. Their exact phase relationship depends upon the geometric orientation of the antenna array and the angle of the incoming signal. The phase relation between signals $f_1 - f_0$ and $f_1' - f_0'$ is determined by the phase difference between signals $f_1$ and $f_1'$ and $f_0'$ and $f_0$. However $f_0$ and $f_0'$ are controllable through the phase control of the step recovery diode multiplier, so by varying the phase of the step recovery diode output by the bias control, then the difference signals $f_1 - f_0$ can be made to add in phase or subtract in phase. So by reading the bias control, the direction the signal is coming from is determined. Also by setting the bias, the phase can be set to receive signals by the array from only a particular direction. Thus signals received from other directions would not be received coherently.

Having thus described our invention, we claim:

1. An electronic scannable receiver antenna array comprising, master oscillator means for supplying an alternating signal, a plurality of individual antenna means arranged in an array for receiving electromagnetic beams and producing a plurality of received signal outputs, each of said antenna means has a step recovery diode frequency multiplier that receives said alternating signal and provides a phase shifted output signal that is multiplied in frequency, mixer means for each of said antenna means for mixing said received signal output and said phase shifted output signal to provide a combined frequency intelligence output, and summing circuit means for summing the intelligence output from each of said mixer means of said plurality of antenna means.

2. An electronic scannable receiver antenna array as claimed in claim 1 including, means for providing a variable direct current bias, and each of said step recovery diode frequency multipliers is responsive to said direct current bias for effecting the phase shift of said multiplied in frequency phase shifted output signal.

3. An electronic scannable receiver antenna array as claimed in claim 1 in which, said alternating signal has positive and negative cycles, each of said step recovery diode frequency multipliers cuts-off reverse current flow at a time interval following the leading edge of said negative cycle, and variable bias means for mixing direct current bias with said input signal and selectively varying the time of said negative cycles without varying the frequency or phase of said input signal.

4. An electronic scannable receiver antenna array as claimed in claim 3 including, bias changing means for directly and coordinately changing the direct current bias on each step recovery diode frequency multiplier for each antenna means.

5. An electronic scannable receiver antenna array as claimed in claim 4 in which, said bias changing means comprising a plurality of potentiometers connected between positive and negative potential sources, and conductor means for connecting said potentiometers directly to each of said step recovery diode frequency multipliers.

6. An electronic scannable receiver antenna element comprising, antenna means for receiving an electromagnetic beam and producing a received signal output, oscillator means for producing an oscillating signal, step recovery diode multiplier means responsive to said oscillating signal for producing an output signal having a multiplied frequency, said step recovery diode multiplier means having direct current bias means for selectively shifting the phase of said output signal relative to the phase of said oscillating signal, and mixer means for mixing said received signal output and said phase shifted output signal.

References Cited

UNITED STATES PATENTS

| | | | |
|---|---|---|---|
| 2,464,276 | 3/1949 | Varian | 343—100.6 |
| 3,153,788 | 10/1964 | Washburne | 343—100.6 |
| 3,161,851 | 12/1964 | Voglis | 343—100.6 |
| 3,202,992 | 8/1965 | Kent | 343—100.6 |
| 3,238,528 | 3/1966 | Hines | 343—100.6 |
| 3,319,249 | 5/1967 | Blachier | 343—100.6 |

RODNEY D. BENNETT, Jr., Primary Examiner

T. H. TUBBESING, Assistant Examiner

U.S. Cl. X.R.

343—854; 307—262